US012782877B2

(12) United States Patent
Tortora et al.

(10) Patent No.: US 12,782,877 B2
(45) **Date of Patent: *Nov. 3, 2026**

(54) TIMEPIECE INCLUDING A MICROGENERATOR AND A LIGHT SOURCE

(71) Applicant: The Swatch Group Research and Development Ltd, Marin (CH)

(72) Inventors: Pierpasquale Tortora, Neuchâtel (CH); Baptiste Hinaux, Lausanne (CH); Cédric Nicolas, Neuchâtel (CH); Jean-Jacques Born, Morges (CH)

(73) Assignee: The Swatch Group Research and Development Ltd, Marin (CH)

( * ) Notice: Subject to any disclaimer, the term of this patent is extended or adjusted under 35 U.S.C. 154(b) by 261 days.

This patent is subject to a terminal disclaimer.

(21) Appl. No.: 18/605,314

(22) Filed: Mar. 14, 2024

(65) Prior Publication Data

US 2025/0251700 A1 Aug. 7, 2025

(30) Foreign Application Priority Data

Apr. 6, 2023 (EP) .................................... 23167062

(51) Int. Cl.

| | |
|---|---|
| ***G04C 10/00*** | (2006.01) |
| ***G04B 19/30*** | (2006.01) |
| ***H02K 11/00*** | (2016.01) |
| ***H02K 11/04*** | (2016.01) |
| ***H02K 21/24*** | (2006.01) |

(52) U.S. Cl.

CPC ............. *G04C 10/00* (2013.01); *G04B 19/30* (2013.01); *H02K 11/0094* (2013.01); *H02K 11/04* (2013.01); *H02K 21/24* (2013.01)

(58) Field of Classification Search

None

See application file for complete search history.

(56) References Cited

U.S. PATENT DOCUMENTS

2021/0191337 A1* 6/2021 Favre .................... G04C 21/06

FOREIGN PATENT DOCUMENTS

| | | | |
|---|---|---|---|
| CH | 717 809 | A2 | 3/2022 |
| EP | 3 838 424 | A1 | 6/2021 |
| FR | 2 262 825 | A1 | 9/1975 |
| JP | 11-55976 | A | 2/1999 |
| JP | 2005-207810 | A | 8/2005 |
| JP | 2010-286428 | A | 12/2010 |
| KR | 200272033 | Y1 * | 4/2002 |

OTHER PUBLICATIONS

Translation of KR200272033, Espacenet (Year: 2002).*
European Search Report for EP 23 16 7062 dated Aug. 22, 2023.

* cited by examiner

*Primary Examiner* — Edwin A. Leon
*Assistant Examiner* — Matthew Daniel Hwang
(74) *Attorney, Agent, or Firm* — Sughrue Mion, PLLC

(57) ABSTRACT

A timepiece including a microgenerator (100), formed by a stator (20) including permanent magnets (25) and a rotor (10) including coils (11) and at least one light-emitting diode (31, 32), which is powered, either directly or indirectly via an electrical and/or electronic circuit, by at least one of the coils which supplies an electric current induced when it rotates relative to the stator (20). The rotor carries all of the electrical and electronic equipment formed by the at least one light-emitting diode, the coils and, where appropriate, the electrical and/or electronic circuit.

20 Claims, 7 Drawing Sheets

TIMEPIECE INCLUDING A MICROGENERATOR AND A LIGHT SOURCE

CROSS REFERENCE TO RELATED APPLICATION

This application claims priority to European Patent Application No. 23167062.1 filed Apr. 6, 2023, the entire contents of which are incorporated herein by reference.

TECHNICAL FIELD OF THE INVENTION

The invention relates to the field of timepieces, in particular those fitted with a mechanical movement, including a microgenerator for powering particular circuits, in particular illumination means.

TECHNOLOGICAL BACKGROUND

Mechanical watches with various additional illumination systems have been commercially available. In one particular embodiment, disclosed in the European patent document EP 3838424, an illumination device is powered by a microgenerator, also referred to as a 'generator', whose rotation is ensured by a mainspring, this illumination device being arranged on a fixed support of the horological movement in a region located at the periphery of the rotor of the microgenerator. The coils of the microgenerator are carried by its stator, whereas the rotor typically carries permanent magnets.

Known illumination systems present major drawbacks for a watch fitted with a mechanical movement, in particular for a top-of-the-range watch for which it is important to preserve the mechanical character of the watch as much as possible. Indeed, these known illumination systems are equipped with at least one light-emitting element, an electronic circuit and an electrical circuit which are arranged on a fixed support at the periphery of the rotor of the microgenerator, which on the one hand introduces a device of the electronic type into the watch and, on the other hand, extends the illumination device itself (i.e. the elements involved in light generation) beyond the horizontal surface defined by the rotor, firstly by the extent of the stator coils and secondly by the arrangement of the at least one light-emitting element, the electronic circuit and the electrical circuit (typically a PCB) which connects the electronic circuit to the coils on the one hand and to the at least one light-emitting element on the other. All of these stationary electrical and electronic parts together occupy a relatively large surface area over and above the surface defined by the rotor of the microgenerator, in addition to accentuating, for a consumer, a hybrid character of the watch.

SUMMARY OF THE INVENTION

The invention aims to solve in particular the above problems of the prior art. Other purposes will also appear on reading the following description of the invention.

To this end, the invention relates to a timepiece according to claim 1, which includes a microgenerator comprising a rotor, carrying at least one coil and at least one light-emitting diode powered by at least one said coil, and a stator including permanent magnets.

According to a first feature of the invention, the rotor carries all of the electrical and electronic equipment formed by said at least one light-emitting diode, said at least one coil and, where appropriate, an electrical and/or electronic circuit arranged between said at least one said coil and said at least one light-emitting diode.

According to an advantageous feature, the permanent magnets are located, when projected axially, inside a circular surface defined by the rotor when it is rotating.

According to another advantageous feature, at least one said light-emitting diode, preferably said at least one light-emitting diode, is powered directly by at least one said coil when it rotates relative to the stator of the microgenerator.

BRIEF DESCRIPTION OF THE FIGURES

The purposes, advantages and features of the invention will be better understood upon reading the following detailed description given with reference to the accompanying drawings, in which.

DETAILED DESCRIPTION OF THE INVENTION

Figure 1:
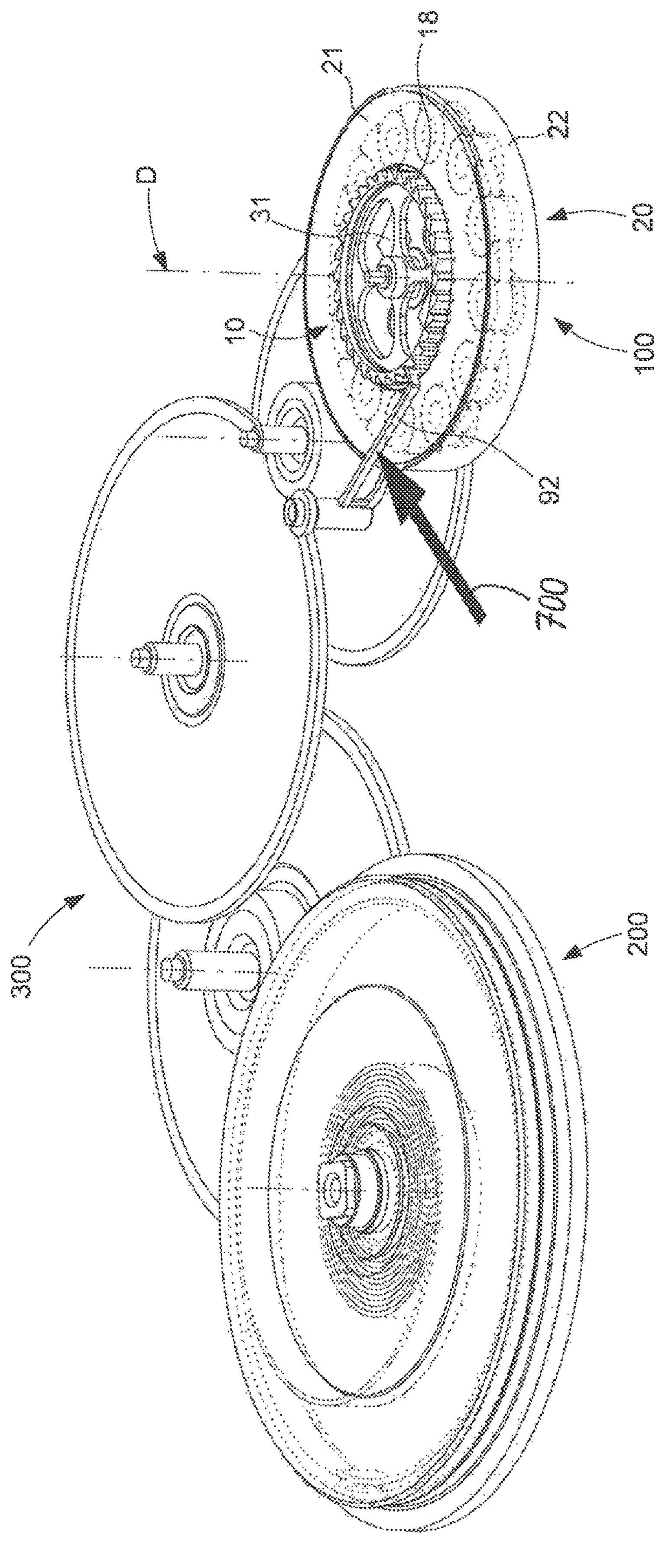
FIG. 1 diagrammatically shows a perspective view of an example application of the invention to a watch including an illumination device: on the left-hand side of the figure, a barrel can be seen, which barrel powers a microgenerator via a gear train, which microgenerator includes a rotor that can rotate relative to a stator; the microgenerator carries at least one light-emitting diode that is powered by at least one coil and that is mounted on the rotor, eccentrically relative to the axis of rotation of the rotor, whereas the stator carries permanent magnets; this rotor carries a ratchet, which cooperates with a click to allow or prevent the rotation thereof, the arrow diagrammatically indicating a device 700 for actuating the click which can rotate in order to stop and release the generator.
Figure 2B:
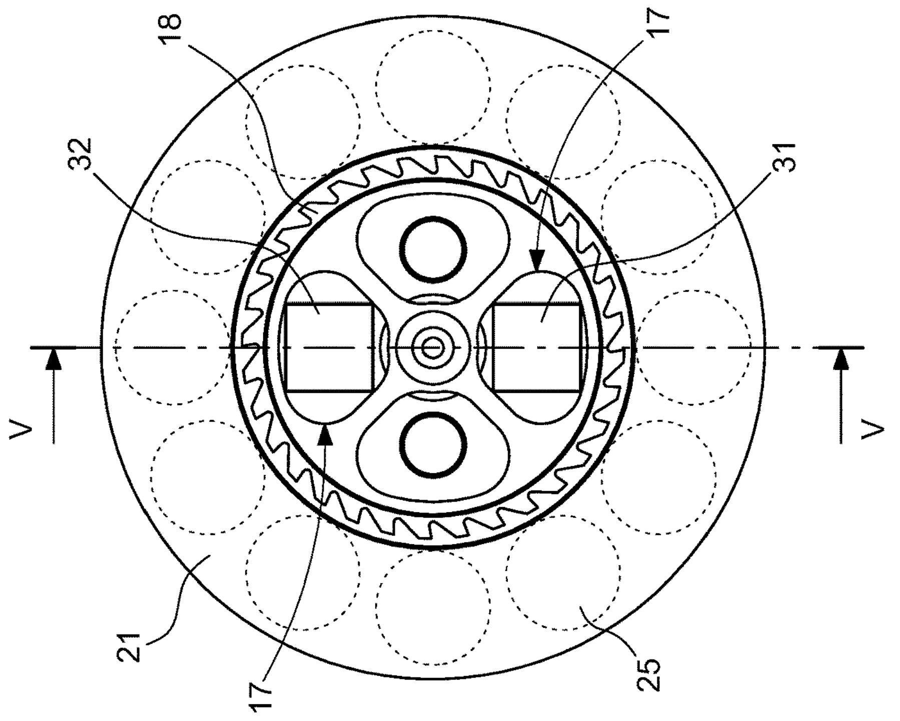
FIG. 2B shows a top view of the microgenerator in FIG. 1.
Figure 2A:
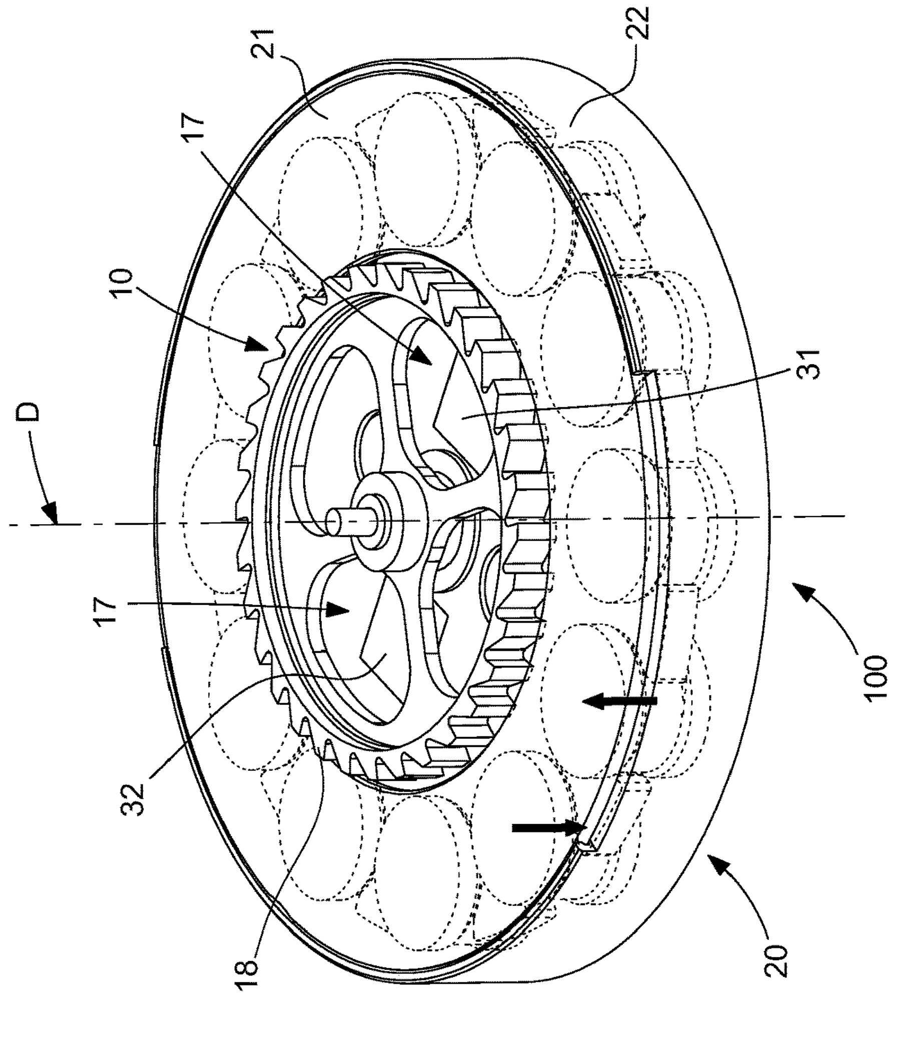
FIG. 2A diagrammatically shows a perspective view of the microgenerator shown in FIG. 1: the two rings of the stator carry permanent magnets of alternating polarity, and the rotor carries coils in their air gap; the arrows show the alternating directions of the magnetic field, in a single direction parallel to the axis of rotation of the rotor; the rotor carries two light-emitting diodes mounted symmetrically relative to this axis of rotation, and both eccentric.

The invention suggests using a light microgenerator to illuminate a particular zone of a timepiece, which is described below with reference to the accompanying figures.

The invention relates to a timepiece 1000, including a microgenerator 100 of the horological type. This microgenerator 100 is formed by a stator 20 including permanent magnets 25 and a rotor 10 including coils 11 and at least one light-emitting diode 31, 32, which is powered, either directly or indirectly via an electrical and/or electronic circuit 37, 38, by at least one of the coils 11 which supplies an induced electric current when it rotates relative to the stator 20. According to the invention, the rotor 10 carries all of the electrical and electronic equipment formed by said at least one light-emitting diode, the coils and, where appropriate, said electrical and/or electronic circuit arranged between said at least one of the coils and said at least one light-emitting diode (also referred to as an 'LED' hereinbelow).

Advantageously, the permanent magnets 25 are located, when projected axially in a direction parallel to the axis of rotation of the rotor 10, inside a circular surface defined by the rotor 10 when it is rotating.

FIGS. 1 to 5 illustrate a rotor 10 including coils 11, in particular flat coils (wafers), and a stator 20 comprising an annular base 21, having an L-shaped radial section, carrying a first part of the permanent magnets 25, and an annular flange 22 closing the annular base and carrying a second part of the permanent magnets 25. The annular base and the annular flange form a stator cage having a C-shaped radial section with three straight portions. The diameter of the microgenerator 100 is typically between 6 mm and 15 mm.

The annular base 21 and the flange 22 are preferably made of a ferromagnetic material forming an external closure for the magnetic field of the permanent magnets 25, which are axially magnetised and arranged on the inside of the stator cage, facing the coils 11 of the rotor 10. More generally, the coils 11 and the permanent magnets 25 are arranged so that the coils pass at least partially over the permanent magnets when the rotor 10 rotates and is driven either directly or indirectly by a barrel 200 or by any suitable drive means. This thus gives a microgenerator 100 of the type with axial magnetisation of the permanent magnets 25 and a "three-level" structure with the rotor 10 carrying the coils 11 placed in the intermediate level, in the space between two levels of permanent magnets 25 located respectively on the two axial sides of the coils 11. The magnets 25 axially opposite each other have the same polarity, and two adjacent magnets on the same level have opposite magnetic polarities. Thus, conventionally, for each of the two levels of magnets, the polarities alternate.

Figure 4:
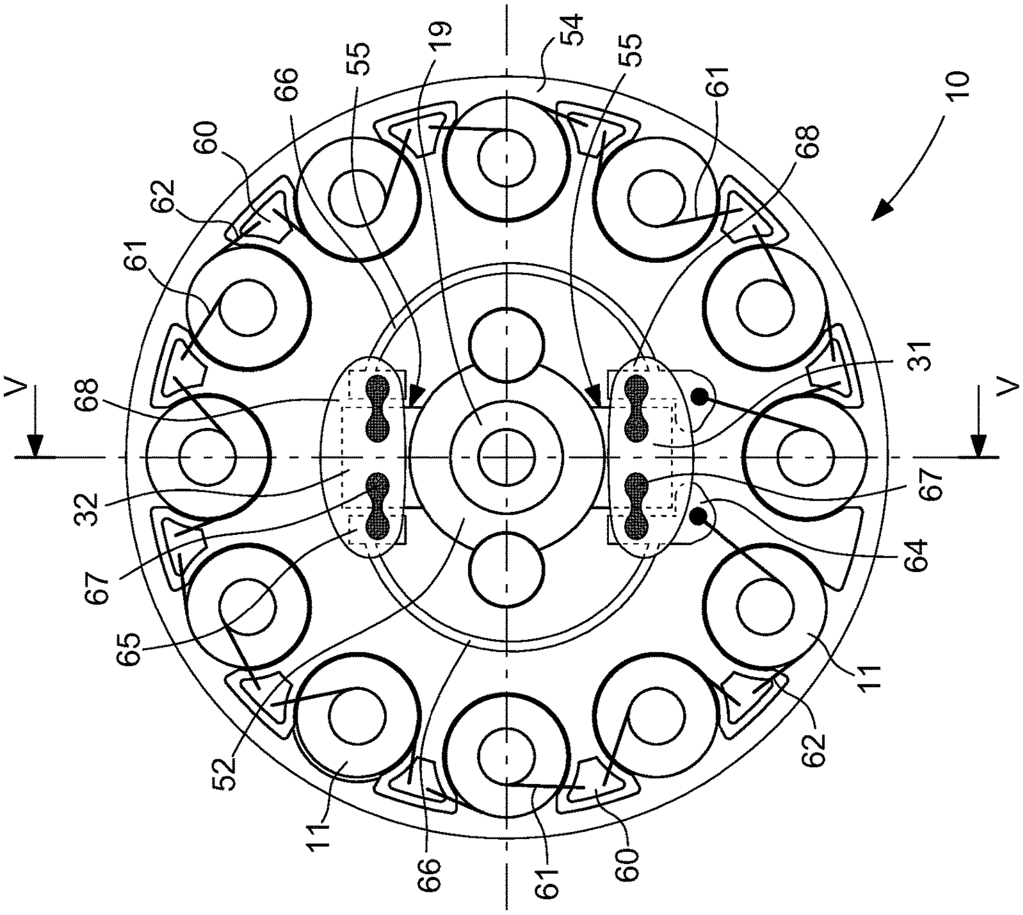
FIG. 4 diagrammatically shows a top view, taken in the direction of the axis of rotation, of the rotor of the microgenerator in FIGS. 1 to 3; it shows the connection configuration between the coils, and between the coils and the light-emitting diodes; an axial hub supports the rotor and further carries a perforated ring including eight apertures to allow the light emitted by each light-emitting diode to pass therethrough towards an illumination device of the timepiece.
Figure 3:
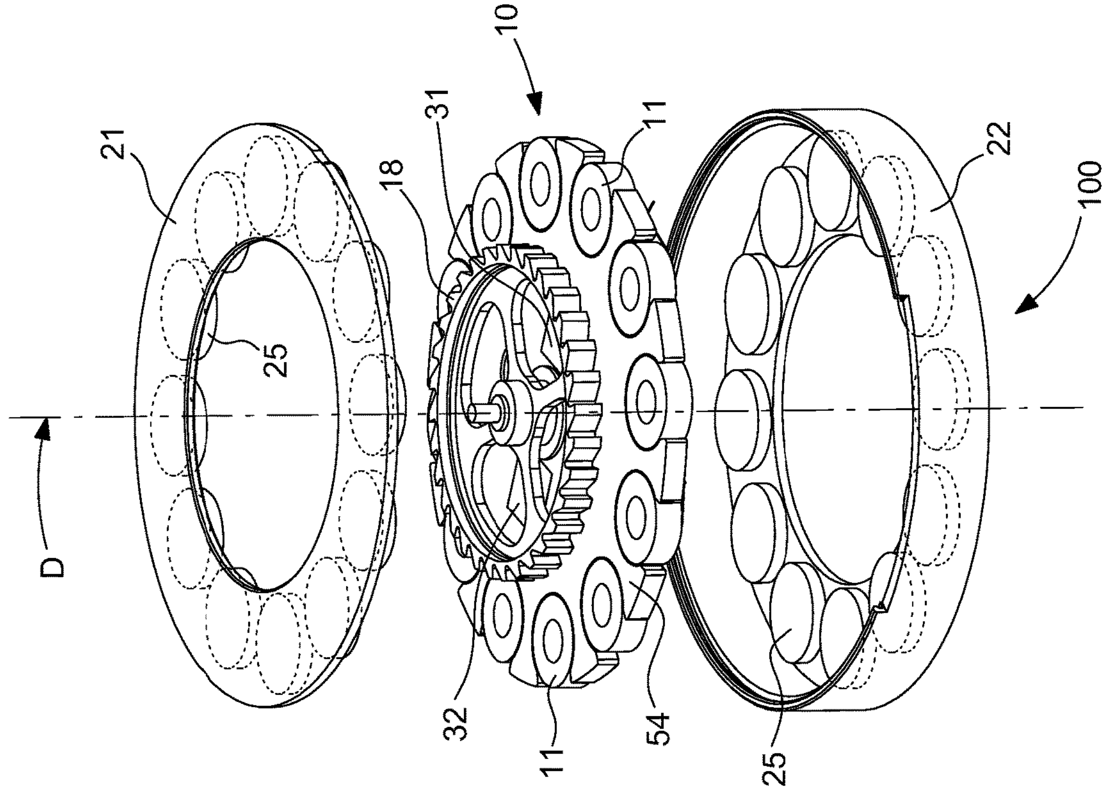
FIG. 3 diagrammatically shows an exploded, perspective view of the microgenerator shown in FIGS. 1 and 2A, 2B: the rotor disc carries 12 coils, and the double row of 12 magnets in the stator rings and the eccentric position of the light-emitting diodes can be seen.

In a preferred alternative embodiment, and as shown in FIG. 4, at least one light-emitting diode 31, respectively 32, is directly powered by at least one coil 11 as it rotates relative to the stator 20 of the microgenerator 100, without any electrical and/or electronic circuit between said at least one light-emitting diode and said at least one coil, with the exception of contact pads and two circular tracks, for example made of gold, in particular without any capacitor and/or other electrical and/or electronic components.

Figure 11:
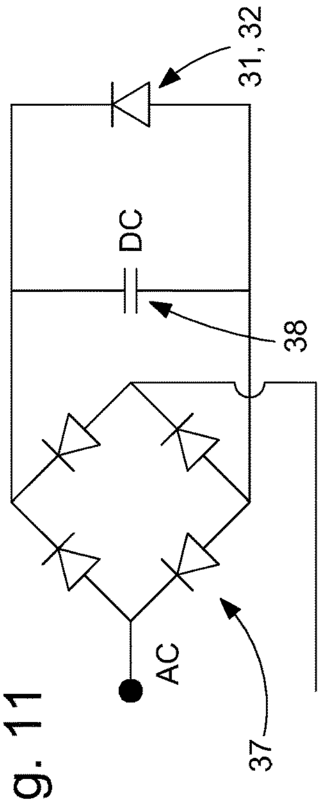
FIG. 11 diagrammatically shows an alternative embodiment of the circuit with which the rotor is equipped, wherein each light-emitting diode is powered indirectly from the coils via an electrical and/or electronic circuit comprising a Graetz bridge rectifier and an output capacitor for this rectifier.
Figure 12:
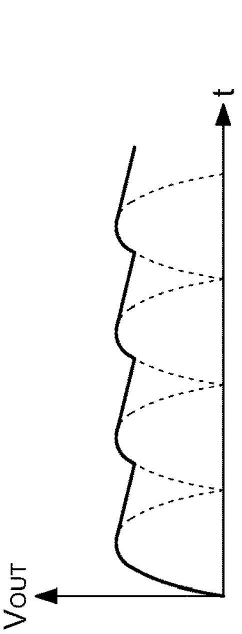
FIG. 12 is a diagram illustrating the voltage changes over time across the terminals of the light-emitting diode according to the connection shown in FIG. 11.
Figure 13:
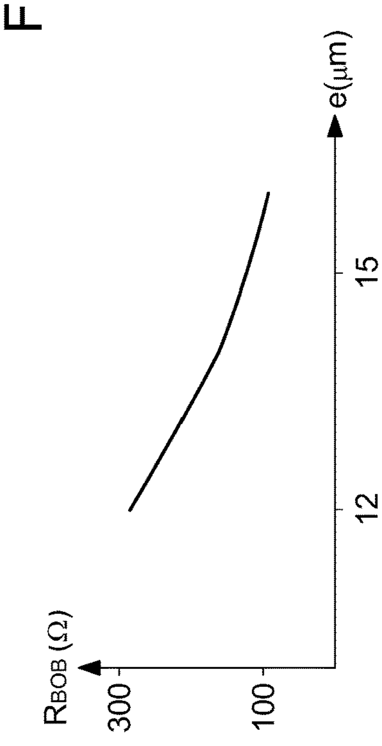
FIG. 13 is a curve showing the influence of coil wire thickness (abscissa) on coil resistance (ordinate)
Figure 14:
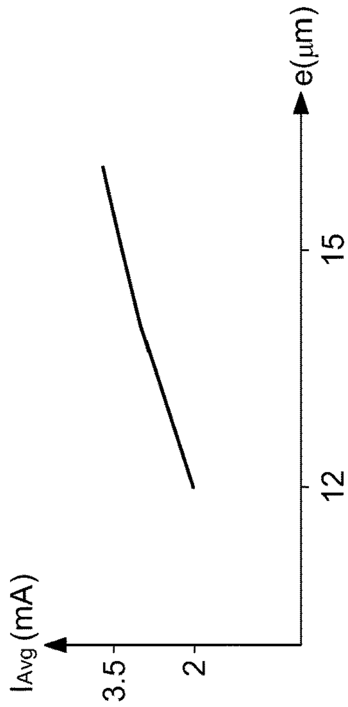
FIG. 14 is a curve showing the influence of coil wire thickness (abscissa) on the current in the light-emitting diodes (ordinate)
Figure 15:
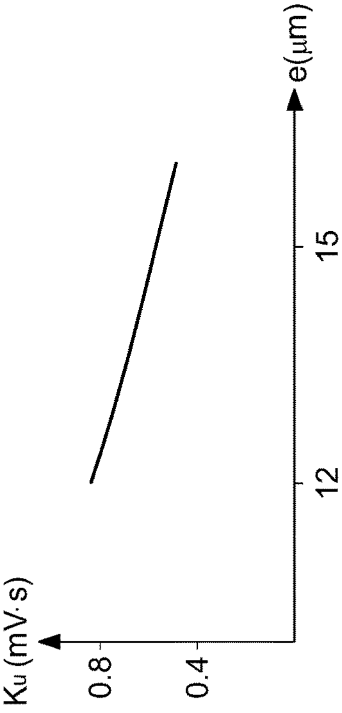
FIG. 15 is a curve showing the influence of coil wire thickness (abscissa) on the induced voltage (ordinate)

In another alternative embodiment, and as shown in FIG. 11, at least one said light-emitting diode 31, 32, is powered indirectly, via the electrical and/or electronic circuit which comprises a Graetz bridge rectifier 37 and an output capacitor 38 of this rectifier, by at least one coil 11 supplying an induced electric current during its rotation relative to the stator 20, of the microgenerator 100.

More particularly, and as can be seen in FIGS. 1 to 5, the rotor 10 carries a pair of light-emitting diodes 31, 32, which are preferably diametrically opposed and arranged in reverse polarity to each other.

More particularly, in an alternative embodiment not illustrated, the rotor 10 carries four light-emitting diodes (also referred to as 'LEDs') at 90° from one another, arranged in pairs of reverse polarity (preferably two diametrically opposed LEDs with the same polarity).

According to an advantageous alternative embodiment, any electrical and/or electronic device that the timepiece includes is mounted on the rotor 10 of the microgenerator 100. A mechanical timepiece is thus spared any wiring or means for transferring electrical energy outside of the rotor 10.

In particular, and as can be seen in FIGS. 1 to 5, the rotor 10 and the stator 20 are mounted coaxially about an axis of rotation D of the microgenerator 100, and said at least one light-emitting diode 31, 32 is mounted eccentrically relative to said axis of rotation D, each light-emitting diode 31, 32 thus describing an annular surface during the rotation of the rotor 10. Moreover, said at least one light-emitting diode 31, 32, is arranged to provide at least a major part of the light 70 that it emits to at least one part of the timepiece 1000 visible to a user of this timepiece, so as to illuminate this at least one visible part.

Thus, the light-emitting diodes 31, 32 are arranged on the rotor 10 to obtain the best result, and the outer structure on side from which light is emitted must be perforated to allow the emitted light 70 to pass for the most part through this outer structure, preferably so that substantially all of the emitted light can pass through this outer structure.

Figure 5:
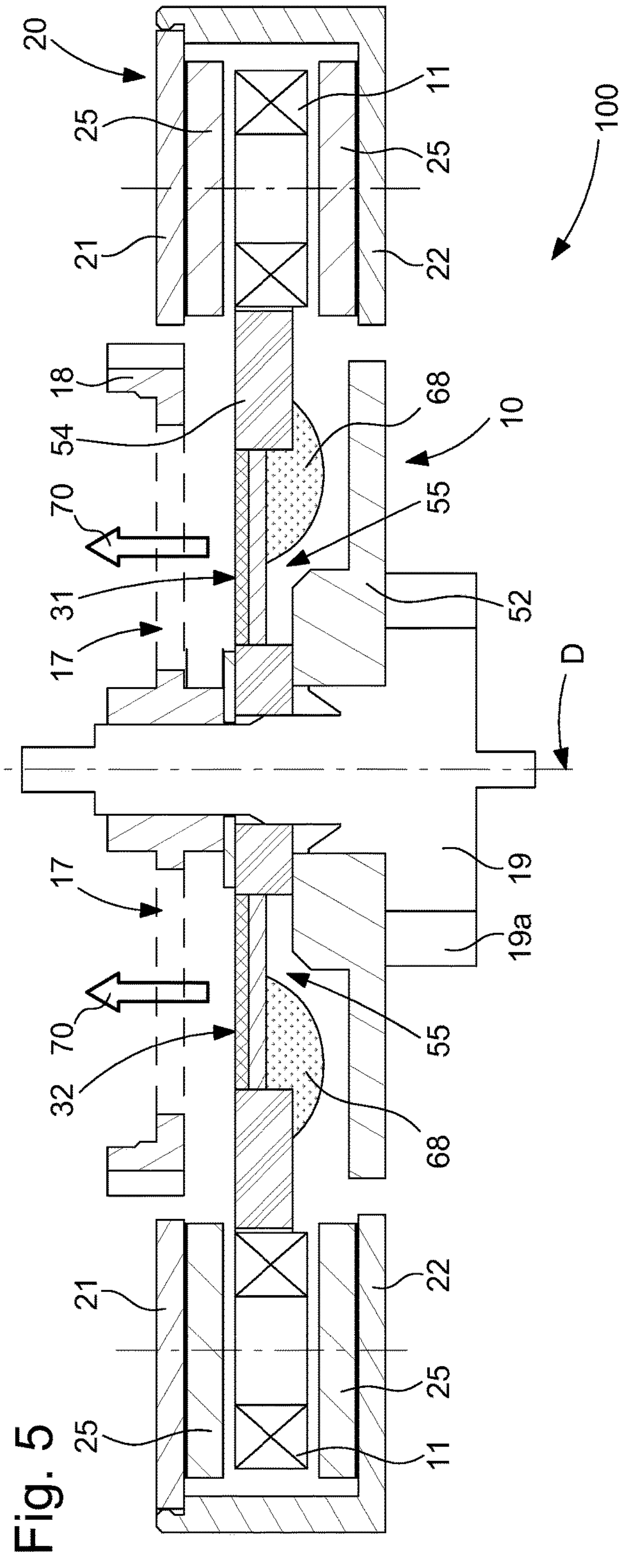
FIG. 5 shows a sectional view, taken along the V-V line, passing through the axis of rotation of the microgenerator in FIGS. 1 to 4; in this advantageous but non-limiting example, the dimensions of the microgenerator are very small, with a stator cage measuring 8.4 mm in diameter and 1.4 mm in thickness.

Furthermore and more particularly, as can be seen in FIGS. 4 and 5, the rotor 10 comprises a hub 19 which comprises a drive pinion 19*a* and which carries a lower annular structure 52, a disc 54, for example made of ceramic, forming a support for the coils 11 arranged in peripheral openings in this disc and for the two LEDs 31, 32 arranged in two respective openings 55 in the disc, and a toothed wheel 18 located above the emission surfaces of the LEDs 31, 32 and including apertures 17 configured to allow the light 70 emitted by each of these LEDs to pass towards means for guiding this emitted light towards said at least one visible part of the timepiece. The toothed wheel 18 is a ratchet forming a device for locking and releasing the microgenerator 100. The lower annular structure 52 is preferably opaque and without openings, so as to mask the openings 55, the contact pads 65, the adhesive drops 68 and the circular tracks 66. The contact pads 60 and the connections between the coils 11 and these contact pads are hidden from an observer's view by the base 22 of the stator cage. Thus, apart from a small portion of the two contact pads 64 that may be visible through the circular slot located between the annular structure 52 and the base 22, the light microgenerator 100 does not reveal any electrical or electronic elements, with the exception of the LED emission surfaces, which have a noble appearance and are located in an internal region of this light microgenerator. Such a construction is particularly well suited to an illumination device incorporated into a top-of-the-range mechanical movement. Moreover, the electrical connections can be made of gold.

The rotor 10 is driven by a barrel 200, through a barrel gear train 300. As indicated, the microgenerator 100 is equipped with a device 400 for locking and releasing the rotor which device comprises the ratchet 18 and a click 92, this device making it possible to activate the microgenerator on demand, in the same manner as for a governor in a musical or striking watch. It is used to start the rotation of the microgenerator on demand and then to stop it. It is thus possible to briefly switch on the illumination system (light microgenerator) several times over a barrel charge.

The rotor 10 comprises a module consisting of the support disc 54 (which is in particular made of a ceramic material) which carries a certain number of small coils 11 on its periphery as well as at least one light-emitting diode, in particular two LEDs 31, 32. Rotation of the coils 11 in the magnetic field of the magnets 25 of the stator 20 generates an induced voltage and thus an induced alternating current, which powers the light-emitting diodes according to the equivalent wiring diagram shown in FIG. 7. The coils 11 are connected in series, with alternating polarities, the inner end 61 and the outer end 62 of each coil being connected respectively to two contact pads 60 formed on the support disc 54. This plurality of coils is connected to the two LEDs, in particular via a printed circuit board which consists of two contact pads 64 for two respective ends of two end coils of the series of coils and for an electrical connection 67 of the first LED 31 to these coils, two contact pads 65 for the electrical connection 67 of the second LED 32, and two circular tracks 66 connecting the two contact pads 64 respectively to the two contact pads 65. The two LEDs 31, 32 are reverse-biased in order to exploit the alternation of the electric current generated in this system for directly powering the LEDs by the coils 11. In the advantageous alternative embodiment shown, the contact pads 64 and 65 and the two circular tracks 66 are directly printed/deposited on the support disc. This eliminates the need for a conventional PCB made of synthetic material. It should be noted that the electrical connections 67 are protected by drops of adhesive 68 which further serve to fasten the LEDs within the respective openings 55 in the support disc 54.

Figure 7:
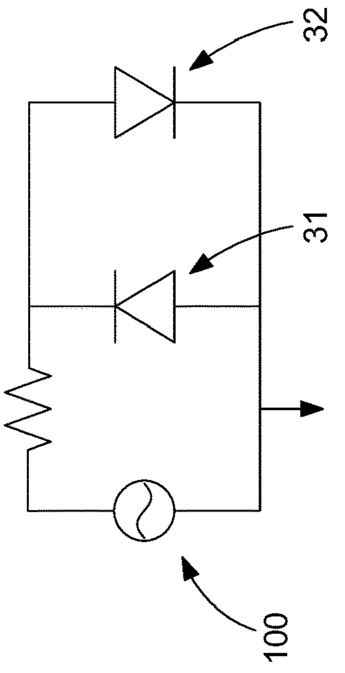
FIG. 7 diagrammatically shows an equivalent electrical circuit for the proposed device, with a microgenerator generating an alternating signal and which is connected in parallel with two light-emitting diodes with reversed polarity. Thus, during the alternation of the signal, one or the other of the diodes will emit light. For frequencies above 30 Hz, the eye no longer distinguishes this alternation and perceives both diodes as being lit at the same time.

An electrical circuit as simple as the one shown in FIG. 7 can thus be used.

Figure 8:
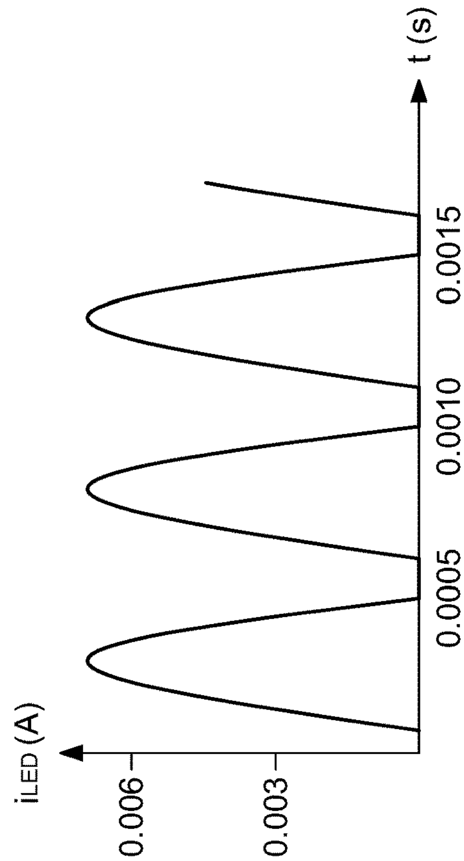
FIG. 8 shows the shape of the current (ordinate) in the light-emitting diodes, as a function of time (abscissa), for rotation at 150 Hz.

The current $i_{LED}$ flowing through each light-emitting diode 31, 32 over time then takes the form shown in FIG. 8.

Figure 9:
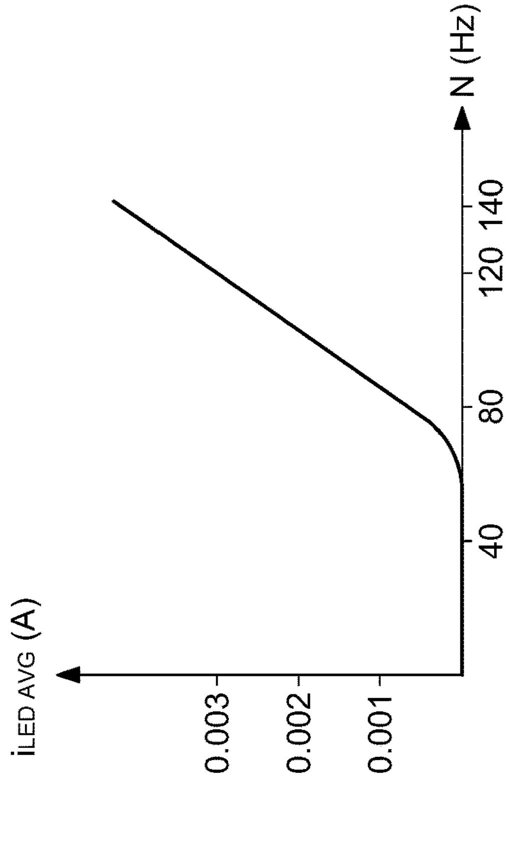
FIG. 9 shows the shape of the average current (ordinate) in the light-emitting diodes as a function of the rotation frequency (abscissa) of the rotor.
Figure 10:
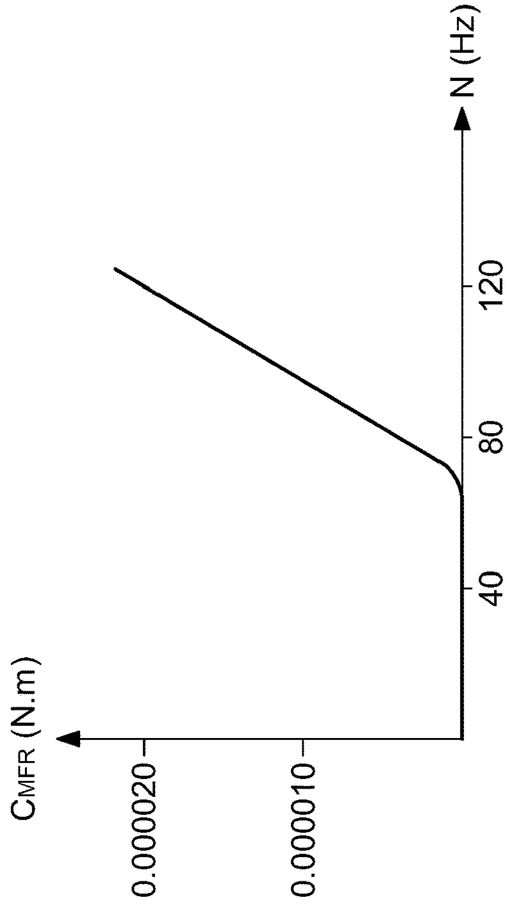
FIG. 10 shows the shape of the average braking torque applied to the rotor (ordinate) by the light-emitting diodes as a function of the rotation frequency of the rotor (abscissa)

What counts for the rotation frequency of the microgenerator is the average current $i_{LED\ AVG}$, shown in FIG. 9, which results in an average braking torque applied to the rotor $C_{M\ FR}$ as shown in FIG. 10.

In one particular example, the barrel initially outputs 20 μN·m to the rotor, and an initial rotation speed of around 140 Hz is obtained, which slows as the barrel is discharged. Without the power dissipated by the light-emitting diodes (LEDs), the assembly would rotate much faster. With regard to the voltage induced in the coils, if: $K_U$ is the induced voltage coefficient for a coil (maximum value of the induced voltage in a coil), $n_{BOB}$ is the number of coils, and ω is the speed of rotation (rad/s), and considering that all of the coils are alternated in series, the induced voltage is $V_{IND}$:

$$V_{IND}=\omega\cdot n_{BOB}\cdot K_U\sin(\omega\cdot n_{BOB}/2\cdot t)$$

The electrical pulsation is equal to $n_{BOB}/2$ multiplied by the speed of rotation ω, because the induced voltage is the derivative of the variation in magnetic flux, which changes a first time from + to − and the next time from − to +. The induced voltage is thus a linear function of the speed of rotation and thus of the frequency of rotation.

The relationship between induced voltage and current in the light-emitting diode is given by the Shockley equation, where Vt is 26 mV at room temperature and n is a quality parameter between 1 and 2: $I=I_S\cdot(e^{VIND/nVt}-1)$.

The dimensions of the magnets and coils are optimised, as shown in FIG. 5, for a relatively small stator cage, with an outer diameter of 8.4 mm and a total thickness excluding the hub of only 1.4 mm.

Figure 16:
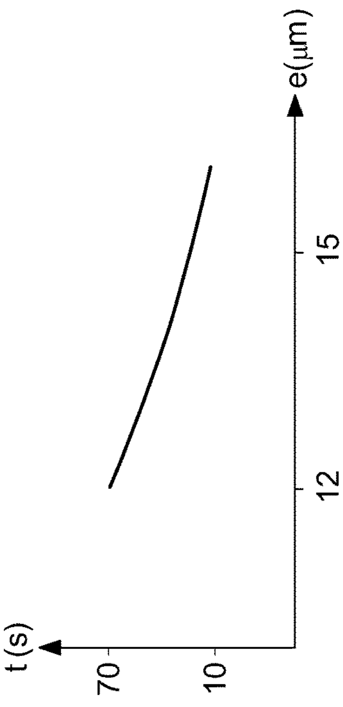
FIG. 16 is a curve showing the influence of coil wire thickness (abscissa) on the total discharge time of the barrel (ordinate)
Figure 17:
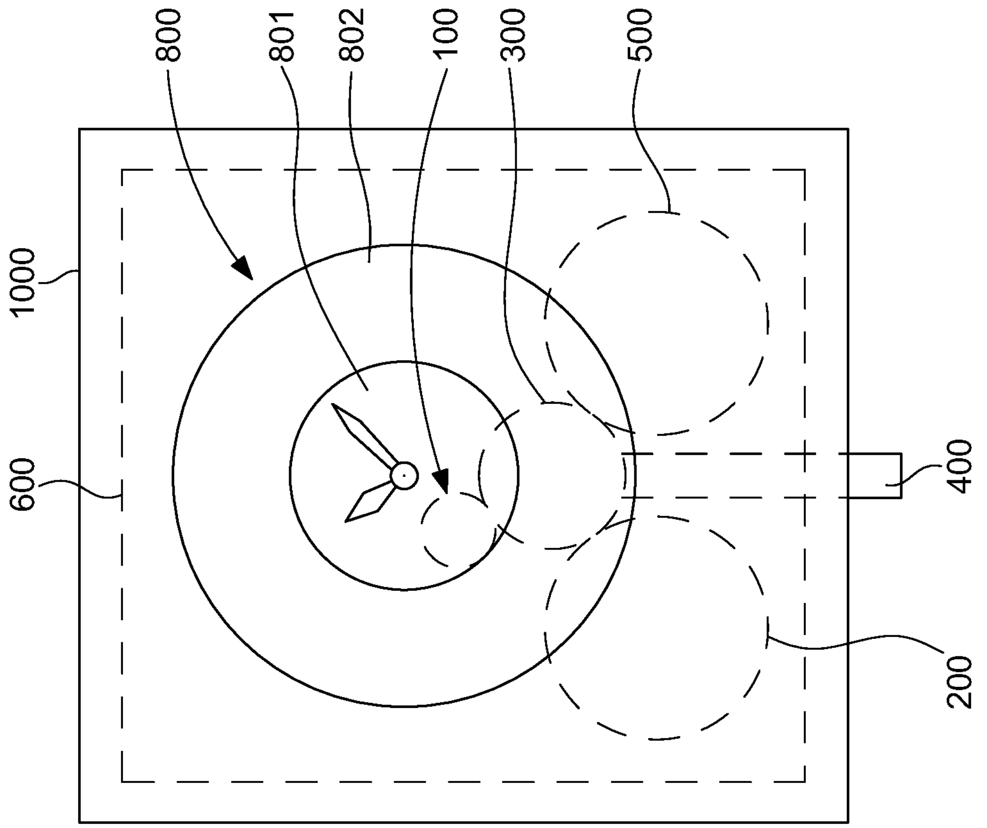
FIG. 17 diagrammatically shows a timepiece including a device for releasing and stopping the microgenerator associated with a control device that can be actuated by a user to trigger the driving of the rotor of the microgenerator, or with an engagement mechanism incorporated in the horological movement.

The number of turns and the diameter of the wire are adapted to ensure operation of the light-emitting diodes. A different number of coils, magnets and different dimensions are also possible. Increasing the volume of the magnets 25, or reducing the air gap, allows the coupling between coils 11 and magnets 25 to be increased. To maximise flux variations, the magnets 25 and the coils 11 are placed as close together as possible. Increasing the volume of the coils 11 or reducing the diameter of the wire allows the induced voltage coefficient Ku (defined as the ratio of the induced voltage to the speed of rotation) to be increased, but also increases the resistance of the coil. In this case, the intensity of the current in the light-emitting diodes is reduced, but the speed of rotation of the rotor is also reduced, thus increasing the barrel discharge time and the illumination time. FIGS. 13 to 16 show the effects of the thickness of the wire of the coil 11 on the resistance (FIG. 13), on the current in the diodes (FIG. 14), on the induced voltage (FIG. 15), and on the total discharge time of the barrel (FIG. 16).

For example, choosing a wire diameter of 14 μm gives a rotor speed of 120 revolutions per second, with the barrel charged, which, with a power reserve of around 5,500 revolutions relative to the rotor, allows for illumination lasting more than 40 seconds.

This potential light energy is then used to best effect to efficiently illuminate a zone of the timepiece 1000 that is visible to the user.

As explained above, the rotor 10 carries a perforated wheel 18 including apertures 17 to allow the light 70 emitted by each light-emitting diode 31, 32 to pass towards means for guiding this emitted light towards at least one visible part of the timepiece.

The timepiece 1000 includes, in the vicinity of the microgenerator 100, at least one stationary light-guiding structure 40, which is arranged to collect, for any angular position of the rotor when the latter is rotating, said at least one major part of the light emitted by each light-emitting diode 31, 32, and to then guide this emitted light towards this at least one visible part of the timepiece, so as to obtain a substantially constant and/or substantially uniform illumination of this visible part when this at least one light-emitting diode is emitting.

More particularly, this at least one stationary light-guiding structure 40 includes at least one light guide 45 which includes, on the one hand, at least one introduction and injection zone 41 superimposed on the trajectory of the light emitted by the light-emitting diode 31, 32 during the rotation of the microgenerator 100 and arranged to introduce this emitted light into this light guide 45, and, on the other hand, at least one zone 42 where the light introduced into the light guide exits and is extracted from this light guide 45; this at least one exit and extraction zone 42 is arranged so as to obtain specific illumination of this at least one visible part of the timepiece 1000.

More particularly, said at least one introduction and injection zone 41 faces the light emission zone of the light-emitting diode 31, 32, and includes at least one coupling patterning zone 805. This coupling patterning zone 805 is patterned with a diffusive rough profile, which is arranged to couple light inside the light guide 45, so as to effect remote optical coupling between the light guide 45 and said at least one light-emitting diode 31, 32, some of whose light rays are deflected into an acceptance cone of the light guide 45 and remain guided by total reflection inside the light guide 45 until they are incident on the at least one exit and extraction zone.

More particularly, said at least one exit and extraction zone 42 includes at least one extraction patterning zone 804, which has a distribution of small distinct reflective patterns, each with a diameter of less than 0.2 mm, and which is provided for extracting the light introduced into the light guide 45 and distributing it substantially uniformly towards said at least one visible part of the timepiece 1000.

More particularly, said at least one introduction and injection zone 41 and said at least one exit and extraction zone 42 are not superimposed when projected in a plane perpendicular to the axis of rotation D of the microgenerator 100.

The advantage of a particular arrangement of the light guide 45 is understood, so as to collect the light in this guide for any angular position of said at least one light-emitting diode 31, 32.

A preferred alternative embodiment includes complete concealment of the ring of light generated by each light-emitting diode 31, 32.

Thus, more particularly, the light emission zone of said at least one light-emitting diode 31, 32 is concealed from the view of the user of the timepiece 1000 by an opaque part 801.

Another alternative embodiment with a different optical effect can also be chosen, to highlight the fact that the light source is annular overall, in which case the ring of light will not be concealed.

More particularly, said at least one stationary light-guiding structure 40 capable of diffusing the light from the light-emitting diode 31, 32, to provide indirect illumination of a part of the timepiece 1000, includes at least one transflective part 802 at said at least one visible part of the timepiece 1000.

More particularly, said at least one extraction patterning zone 804 is patterned so that the extraction is not uniform, with the coefficient of light intensity extracted per unit of area not having a constant value over the entire surface area.

More particularly, said at least one extraction patterning zone 804 is configured so that the extracted light intensity is substantially constant.

More particularly, the timepiece 1000 includes at least one dial 800, a first part of which is such a visible part of the timepiece and can be illuminated by at least one transflective part 802 of said at least one stationary light-guiding structure 40, and a second part of which is concealed by an opaque part 801 of said at least one stationary light-guiding structure 40. More particularly and in a non-limiting manner, this opaque part 801 conceals said at least one microgenerator 100 and each light-emitting diode 31, 32.

More particularly, a dial is illuminated by a sapphire light-guiding structure and a light microgenerator, i.e. a microgenerator including a light source, as described above.

A special optical system was developed to illuminate the perimeter of a dial in the dark. The method consisted of modelling the system, for example using the "Backlight Optimisation®" module of the "Lighttools®" raytracing" software, or similar. We firstly defined the properties of the light source. As described previously, two light-emitting diodes are arranged in diametrically opposed positions on the rotor 10 of the microgenerator 100. When this rotor 10 rotates at high speed, these two light-emitting diodes 31, 32 also rotate, thus generating a ring of light. The simulation thus used a static ring of light as the light source.

Figure 6:
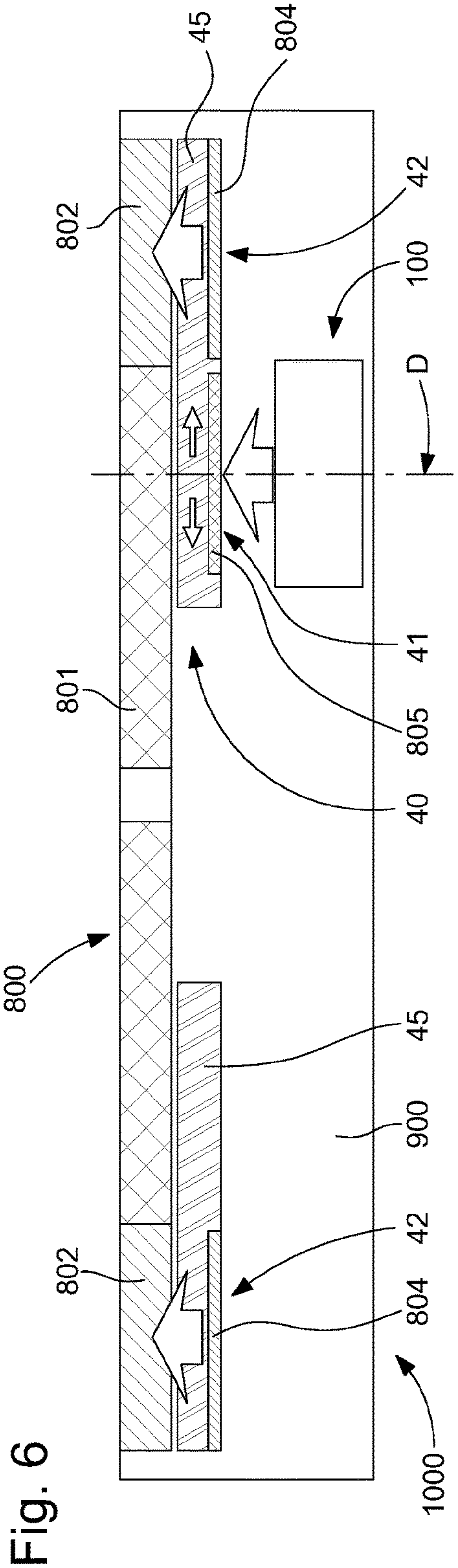
FIG. 6 diagrammatically shows a sectional view, passing through the axis of rotation of the microgenerator in FIGS. 1 to 5, of the illumination device of the timepiece according to the invention, illustrated for the particular and non-limiting case of illuminating an annular zone of a watch dial shown at the top part of the figure with an opaque central part and a transflective annular peripheral part, and which includes, therebelow, a stationary light-guiding structure, which is itself located above the light microgenerator, which is concealed here, in a non-limiting manner, by the opaque part of the dial. This stationary light-guiding structure includes, under the opaque part and under the transflective part of the dial, a light guide which includes, on the one hand, an introduction and injection zone superimposed on the trajectory of each light-emitting diode during rotation of the rotor of the microgenerator and arranged to introduce light emitted by each light-emitting diode into the light guide, symbolised by a first arrow in the light guide, and on the other hand a zone where the light exits and is extracted from the light guide, symbolised by a second arrow at the periphery, under a transflective part of the dial. Above the microgenerator and the first arrow, a zone concealed by an opaque part can be identified, from which two small arrows emanate, and which is a coupling zone, patterned with a diffusive profile, for a remote optical coupling between the light guide and the light-emitting diode. Next to this coupling zone, and further towards the periphery, the exit and extraction zone includes an extraction patterning zone with a distribution of small juxtaposed reflective patterns, in order to extract the light from inside the light guide and distribute it substantially uniformly towards the visible part to be illuminated.

As can be seen in FIG. 6, a sapphire light guide 45 is arranged below the dial 800. Sapphire is chosen because this material is suitable for haute horlogerie (high-end watchmaking). The light guide 45 takes the form of an annular disc having for example, in a non-limiting manner, a thickness of 0.4 mm, an outer diameter of 38 mm and an inner diameter of 14 mm. This geometry was chosen to force the light to circulate around the periphery of the part and thus be concentrated in the zone to be illuminated. The face below the disc (that facing the microgenerator 100) has two types of patterning: a coupling patterning zone 805 and an extraction patterning zone 804.

The coupling patterning zone 805 is patterned with a rough diffusive profile, the function of which is to couple the light inside the disc. The fact that the light sources are moving prevents close optical coupling with the light guide. This is thus done from a distance. As they pass through the coupling zone, some rays from the ring of light are deflected into the acceptance cone of the sapphire light guide 45 and remain guided by total reflection therein. The size of the coupling zone is adapted to the dimensions of the microgenerator 100 and the distance between it and the light guide 45. It is unnecessary, or even detrimental, to extend the coupling zone beyond the surface of the guide occupied by the light cone. In fact, the coupling structure can further contribute to the extraction of light to the detriment of the total brightness of the zone to be illuminated.

The second surface patterning is the extraction patterning zone 804, characterised by a distribution of small reflective patterns, in particular but not limited to circles, approximately 0.12 mm in diameter, and has the function of extracting light from inside the light guide 45 by distributing it uniformly around the part. The distribution of reflective patterns is computed by the software algorithm. This distribution of reflective patterns is not uniform, and the density varies locally so that the light extracted is the same all around the part and is thus uniform. The starting point for the computation is a circular uniform density distributed over the zone to be illuminated. The software algorithm then looks for a pattern density distribution such that the light is extracted uniformly all around the disc. In computing this distribution, the software takes precise account of the geometry of the light guide, the material of which it is made, the injection zone where the light is injected into the light guide and the incident light distribution over this injection zone. The advantage of this method for computing the pattern array, in particular small separate circles, is that the uniformity of the illumination is normally ensured independently of the actual reflectivity properties of the patterns.

If the patterns have low reflectivity, the total amount of light extracted will be low. If the patterns have high reflectivity, the total amount of light extracted will be high. However, the uniformity of the illumination will be the same in both cases. The light extracted from the guide passes through the peripheral zone of the dial and illuminates it from behind. To achieve this, the dial will be made from a transflective material such as a fine white ceramic, or as is more commonly used in watchmaking, an enamelled ceramic.

The surface patterning of the light guide described above is difficult to achieve mechanically on a hard material such as sapphire. However, they are perfectly achievable by pico- and femtosecond laser machining.

It is understood that, to achieve a good result, the light extraction zone must be configured so that extraction is not constant, i.e. so that the coefficient of light intensity extracted per unit of area is not a constant coefficient, given that the light is injected locally into the light guide. The structure of the light extraction zone is advantageously configured such that the light intensity extracted is substantially constant.

Very different configurations of use are possible, because the optical system developed for the invention allows for a significant offset between, on the one hand, the light source constituted by the ring of light emitted by each light-emitting diode and, on the other hand, a visible zone to be illuminated, which can be relatively far from the microgenerator in the timepiece.

For example, a configuration for illuminating a dial 800 can be chosen, with at least one zone of the dial 800 being illuminated, and with the light guide 45 being arranged beneath this dial 800. A ring of light superimposed on an hour circle and/or graduation is also possible.

Advantageously, the timepiece 1000 includes at least one control device 400 for controlling the microgenerator 100, allowing this microgenerator to be released and stopped on command via a device for locking and releasing the rotor 10 included in this control device. The control device 400 can be actuated by a user to trigger the driving of the rotor 10 of the microgenerator 100 and then to stop it, this control device including an external control member, in particular a push-button or a bolt. In another embodiment, the control device comprises an engagement mechanism 500 that can be actuated by the horological movement 600 included in the timepiece 1000. These mechanisms are well known in striking or repeating watches. In particular, the user can release the microgenerator by pressing a push-button actuating a lever. The light remains on until the push-button is released. In the other embodiment mentioned above, the mechanism for engaging the horological movement acts, for example, on the same lever, in particular by means of an intermediate lever, preferably for a given period of time. Any similar system can be devised to switch the light on and off on command. In particular, the various mechanisms provided are arranged to momentarily release the click 92 from the ratchet 18 and thus allow the rotor 10 to rotate.

More particularly, the timepiece 1000 includes at least one drive mechanism which is arranged to drive the rotor 10 of the microgenerator 100.

The invention has numerous advantages.

The arrangement of the light-emitting diodes directly on the microgenerator means that there is no need for any sliding contact connections, conductive wires or PCB tracks. This ensures compatibility with high-end watchmaking. The advantageous arrangement thereof on the rotor avoids the presence of any electronic components made of materials that are not compatible with a top-of-the-range mechanical watch. Light-emitting diodes are thus the only components that can be described as “electronic”; however, their composition is inorganic and the vast majority of the volume is made up of crystal and metal. As a result, the proposed layout is aesthetically discreet and also compatible with the construction of a skeleton watch with an exposed system.

One or more electroluminescent diodes can be powered without the need for a primary cell or battery. It goes without saying that a levelling capacitor embedded in the rotor can be used, but this does not seem necessary as the rotor rotates at a relatively high speed, thus preventing the periodic variation in brightness from being perceptible to the human eye. Indeed, the preferred embodiment of the invention has the advantage of having a passive circuit without any intermediate energy storage, thanks to each diode being powered directly by the coils, without necessarily requiring an induced voltage rectifier or levelling capacitor. The light-emitting diode does not have any persistent luminosity when the current is switched off; however, the user's eye sees persistent illumination because, with a rotation in the order of a hundred hertz and, for example, 12 or 14 poles in the microgenerator, there is flashing in the order of one kHz, which is imperceptible to the eye. As regards the rotation of the microgenerator, small braking torques occurring a thousand times a second will level the speed of rotation. An energy storage capacitor is not desirable, as it would not have a voltage variation that would follow the induced voltage variation quickly enough, and would not be very effective for speed regulation.

The solution, which uses no electronics other than a (passive) Graetz bridge embedded in the rotor, and no battery, guarantees full compatibility with high-end watchmaking.

The possibility of activating the illumination function and of stopping it after a set time is highly advantageous. This option is not available in the watches of the prior art.

When the light-emitting diodes (LEDs) rotate at high speed, they generate an annular light distribution that is almost continuous and uniform for the human eye and whose surface extension is much greater than that of a light-emitting diode. Moreover, the arrangement of a light guide with a coupling zone arranged to collect the light from the ring of light generated by the LEDs when the rotor rotates is very advantageous because this makes it possible to transform a ring of light into specific illumination of at least one visible part of the watch other than said ring of light, which is preferably concealed from the direct view of an observer, and further improves the constancy of the illumination produced.

The use of the light microgenerator in combination with a remote light guide in order to distribute the light elsewhere in the watch is very advantageous, giving an entertaining light effect (luminous decorations) or functional light effect (for reading the time or any other display), thanks to one or more zones for extracting light from the light guide, which zones are arranged preferably for a substantially uniform extraction of a visible luminous surface, in particular for the illumination of a ring of the dial of a watch including an hour graduation.

NOMENCLATURE

D axis of rotation of the microgenerator
10 rotor
11 coil
17 aperture in the ratchet
18 ratchet
19 hub
19*a* pinion
20 stator
21 annular cover of the stator
22 annular base of the stator
25 permanent magnet
31, 32 light-emitting diode (LED)
37 Graetz bridge
38 Graetz bridge output capacitor
40 stationary light-guiding structure
41 introduction and injection zone
42 exit and extraction zone
45 light guide
52 annular structure of the rotor
54 support disc of the rotor
55 opening in the support disc
60 contact pad
61, 62 end part of the coils
64, 65 contact pad
67 electrical connection of the LEDs
68 drop of resin
70 emitted light
100 microgenerator
200 barrel
300 barrel gear train
400 control device
500 engagement mechanism
600 movement
800 dial
801 opaque part
802 transflective part
1000 timepiece

The invention claimed is:

1. A timepiece including a microgenerator, formed by a stator and a rotor and comprising at least one coil and permanent magnets, and at least one light-emitting diode which is powered, either directly or indirectly via an electrical and/or electronic circuit, by at least one said coil; characterised in that the stator carries said permanent magnets and the rotor carries said at least one coil which powers an induced electric current when the rotor rotates relative to the stator; and in that the rotor carries all of the electrical and electronic equipment formed by said at least one light-emitting diode, said at least one coil and portions of said electrical and/or electronic circuit.

2. The timepiece according to claim 1, characterised in that said permanent magnets are located, when projected axially, inside a circular surface defined by said rotor when it is rotating.

3. The timepiece according to claim 1, characterised in that at least one said light-emitting diode is powered directly by at least one said coil when said at least one said light-emitting diode rotates relative to the stator of the microgenerator.

4. The timepiece according to claim 1, characterised in that at least one said light-emitting diode is powered indirectly, via said electrical and/or electronic circuit which comprises a Graetz bridge rectifier, by at least one said coil supplying an electric current induced during its rotation relative to the stator of the microgenerator.

5. The timepiece according to claim 1, characterised in that the rotor carries at least one pair of said light-emitting diodes, which are preferably diametrically opposed and arranged with opposite polarity.

6. The timepiece according to claim 1, characterised in that any electrical and/or electronic device that the timepiece includes is mounted on said rotor of the microgenerator.

7. The timepiece according to claim 1, characterised in that the rotor and the stator are mounted coaxially about an axis of rotation (D) of the microgenerator, and said at least one light-emitting diode is mounted eccentrically relative to said axis of rotation (D), each light-emitting diode thus describing an annular surface during the rotation of the rotor; and in that said at least one light-emitting diode is arranged to provide at least a major part of the light that it emits to at least one part of the timepiece visible to a user of this timepiece, so as to illuminate said at least one visible part of the timepiece.

8. The timepiece according to claim 7, characterised in that the rotor comprises a hub which also carries a perforated ring including apertures to allow the light emitted by said at least one light-emitting diode to pass towards means for guiding this emitted light towards said at least one visible part of the timepiece.

9. The timepiece according to claim 7, characterised in that this timepiece includes at least one stationary light-guiding structure arranged to collect, for any angular position of the rotor when the latter is rotating, said at least one major part of the light emitted by said at least one light-emitting diode, and to then guide this emitted light towards said at least one visible part of the timepiece, so as to obtain a substantially constant and/or substantially uniform illumination of this visible part when said at least one light-emitting diode is emitting.

10. The timepiece according to claim 9, characterised in that said at least one stationary light-guiding structure is capable of diffusing the light from said at least one light-emitting diode so as to provide indirect illumination of a part of said timepiece, and includes at least one transflective part at said at least one visible part of the timepiece.

11. The timepiece according to claim 9, characterised in that said at least one stationary light-guiding structure includes at least one light guide including at least one introduction and injection zone arranged to receive light emitted by said at least one light-emitting diode during the rotation of said at least one microgenerator and arranged to introduce this emitted light into said light guide, and, at least one zone where the light introduced into the light guide exits and is extracted from this light guide, said at least one exit and extraction zone being arranged so as to obtain specific illumination of said at least one visible part of the timepiece.

12. The timepiece according to claim 11, characterised in that said at least one introduction and injection zone is facing a light emission zone of said at least one light-emitting diode and including at least one coupling patterning zone arranged to couple light inside said light guide, so as to effect remote optical coupling between said light guide and said at least one light-emitting diode, some of whose light rays located in an acceptance cone of said light guide remain guided by total reflection inside said light guide until they are incident on said at least one exit and extraction zone.

13. The timepiece according to claim 11, characterised in that said at least one exit and extraction zone includes at least one extraction patterning zone, which has a distribution of small distinct reflective patterns, each with a diameter of less than 0.2 mm, and which is provided for the extraction of the light introduced into the light guide and distributing it substantially uniformly towards said at least one visible part of the timepiece.

14. The timepiece according to claim 13, characterised in that said at least one extraction patterning zone is patterned so that the extraction is not uniform, with a coefficient of light intensity extracted per unit of area thus not having a constant value over an entire surface area.

15. The timepiece according to claim 13, characterised in that said at least one extraction patterning zone is configured so that the extracted light intensity is substantially constant.

16. The timepiece according to claim 11, characterised in that said at least one introduction and injection zone and said at least one exit and extraction zone are not superimposed when projected in a plane perpendicular to the axis of rotation (D) of said microgenerator.

17. The timepiece according to claim 16, characterised in that a light emission zone of said at least one light-emitting diode is concealed from a view of the user of said timepiece by an opaque part.

18. The timepiece according to claim 17, characterised in that the timepiece includes a dial arranged above the stationary light guide structure and a first part whereof is said visible part of said timepiece, which can be illuminated by said stationary light guide structure, and a second part whereof is said opaque part.

19. The timepiece according to claim 1, characterised in that the timepiece includes a device for releasing and stopping said microgenerator, wherein the device comprises a control device capable of being actuated by a user to trigger driving of said rotor of the microgenerator, said control device including a control member and/or a push-button and/or a bolt, and/or an engagement mechanism which can be actuated by a mechanism included in said timepiece.

20. The timepiece according to claim 1, characterised in that the timepiece includes at least one drive mechanism arranged to drive said rotor of the microgenerator.

* * * * *